United States Patent [19]

Loup et al.

[11] Patent Number: 4,574,843
[45] Date of Patent: Mar. 11, 1986

[54] SOLENOID VALVE OVERRIDE CARTRIDGE

[75] Inventors: Ronald L. Loup, Clarkston; Curtis H. Day, Manchester, both of Mich.

[73] Assignee: Double A Products Co., Manchester, Mich.

[21] Appl. No.: 498,273

[22] Filed: May 26, 1983

[51] Int. Cl.[4] .............................................. F15B 13/43
[52] U.S. Cl. .......................... 137/625.65; 137/625.64; 251/129.03
[58] Field of Search ...................... 137/625.64, 625.65; 251/130, 137

[56] References Cited

U.S. PATENT DOCUMENTS

| | | | |
|---|---|---|---|
| 2,981,287 | 4/1961 | Caslow | 137/625.64 |
| 3,416,381 | 12/1968 | Allen | 251/130 |
| 3,429,340 | 2/1969 | Opel et al. | 251/130 |
| 3,701,366 | 10/1972 | Tirelli et al. | 137/625.65 |
| 3,899,003 | 8/1975 | Tirelli | 137/635.65 |
| 3,938,555 | 2/1976 | Swickley | 137/625.64 |
| 3,991,973 | 11/1976 | Politz et al. | 251/DIG. 1 |
| 4,194,173 | 3/1980 | Loup et al. | 335/260 |
| 4,201,116 | 5/1980 | Martin | 137/625.64 |
| 4,207,917 | 6/1980 | Opel et al. | 251/130 |
| 4,293,002 | 10/1981 | Moriyama et al. | 137/625.64 |
| 4,353,394 | 10/1982 | Loup | 251/137 |
| 4,406,307 | 9/1983 | Loup et al. | 251/137 |
| 4,456,434 | 6/1984 | Ibiary | 137/625.65 |

FOREIGN PATENT DOCUMENTS

| | | | |
|---|---|---|---|
| 2019880 | 10/1973 | Fed. Rep. of Germany | 137/625.67 |
| 156784 | 9/1983 | Japan | 137/625.64 |
| 2041501 | 9/1980 | United Kingdom | 251/30 |
| 2044892 | 10/1980 | United Kingdom | 137/625.64 |

OTHER PUBLICATIONS

Non-Locking Manual Override Assy. Valvair Corporation, Akron, Ohio.

Primary Examiner—Henry C. Yuen
Assistant Examiner—John Kwon
Attorney, Agent, or Firm—Stephenson & Boller

[57] ABSTRACT

An override cartridge for a solenoid operated fluid valve provides convenient conversion of a valve to include or exclude a mechanical override feature. The disclosed construction comprises a tubular cartridge body containing the override, with the tubular body having a screw thread connection to the valve. Other features are also disclosed.

39 Claims, 13 Drawing Figures

SOLENOID VALVE OVERRIDE CARTRIDGE

BACKGROUND AND SUMMARY OF THE INVENTION

This invention relates generally to solenoid actuated valves and more specifically to an improvement in a mechanical override for a solenoid actuated hydraulic valve.

Solenoid actuated hydraulic valves are used in many types of machines to control the flow of fluid power to and from hydraulic power devices such as hydraulic cylinders or hydraulic motors. The valves are controlled by circuits which selectively energize the various solenoids in accordance with the intended operating sequence for the various parts of a machine. Thus, for proper machine operation it is intended that the solenoid valves always be under the control of the associated control circuits, and unauthorized tampering with the valves is not intended. In other words when a machine is in productive use, its valves should not be susceptible to unauthorized tampering, and hence from this standpoint any features which render a valve more prone to tampering than it might otherwise be are, as a general rule, to be avoided if possible. Yet from other standpoints, the incorporation of certain features such as mechanical overrides are demanded even if they render a valve more prone to tampering.

Mechanical overrides (often called manual overrides) are incorporated in certain existing solenoid actuated hydraulic valves to override the operation of the solenoids. Mechanical overrides are for the principal benefit of certain machine builders to facilitate assembly, adjustment, trouble shooting, and check-out of machines by their personnel. Once a given machine has been tuned to proper operation by the builder, the mechanical overrides have served their principal purpose. After a machine has been accepted by a customer, the elimination of mechanical overrides will render the machine less prone to unauthorized tampering.

Thus, the manufacturer of hydraulic valves is confronted with a dilemma. In order to offer products acceptable to certain machine builders, the incorporation of mechanical overrides into solenoid operated valves is virtually essential. On the other hand, a customer who purchases a machine from one of these builders may deem the presence of mechanical overrides objectionable. He is left with really only a limited number of choices. For one, he may begrudgingly accept the mechanical overrides and run the risk of unauthorized tampering; or he must incur the extra expense of taking measures to restrict access to the valves. An unfortunate drawback in restricting access to the valves is that it can hinder legitimate access by skilled maintainence personnel in times of need.

Because certain machine builders want mechanical overrides to facilitate their own manufacturing and check-out procedures, their position invariably prevails. Those machine tool builders leave it to their customers to take adequate precautions against unauthorized tampering with the mechanical overrides. As a practical matter, control of unauthorized tampering with mechanical overrides is not 100% foolproof even though reasonable safeguards may be taken.

One possible solution to this problem would be to replace all mechanical override types of solenoid valves on a machine before it is put to use by a customer. Where a machine contains a vast number of such valves, this would impose a significant delay in putting the machine into productive use, not to mention the extra cost of having to replace the valves.

Therefore, this whole situation has been one which has been tolerated over the years, even though it is not a desirable one.

The present invention is directed to a new and improved mechanical override for a solenoid operated control valve which provides a particularly convenient solution to this problem and which can be relatively expeditiously accomplished and with must less expense than would be involved in replacing complete valve assemblies. The requirements of machine builders can be accommodated since a valve embodying principles of the present invention will comprise a mechanical override feature, yet the desires of users of the machines can also be met since the mechanical overrides are in the form of cartridges which can be quickly removed from valves and replaced by plugs to eliminate the manual override functions from the valves.

A further attribute of the invention is that because of its replaceable cartridge nature, it can accomodate standard valve bodies and valve configurations. In other words, extensive re-tooling of existing valve models is not required.

The improvement of the invention appears from casual observation to be relatively simple, yet its simplicity belies the myriad of specific features which are embodied in its construction and the attributes which it possesses. Some of these attributes are specific to the particular embodiment of valve involved but others have generic application. In the disclosed preferred embodiment of the present invention, the mechanical override cartridge separably mounts on a solenoid tube. The cartridge comprises a main tubular body which removably mounts on the solenoid tube via a screw thread connection. The mechanical override forms a closure for, but is axially shiftable within, the bore of the main cartridge body. Thus, when a solenoid actuated valve is manufactured for a machine builder who demands mechanical override features, the valve is manufactured with the mechanical override cartridge mounted on the solenoid tube. This allows the valve to be solenoid operated in the usual manner by electrical control circuits, yet it affords the machine tool builder the capability of conveniently mechanically overriding the solenoid's operation. The mechanical override can be manually operated by authorized personnel through use of a suitable tool.

When the machine builder has completed a machine and it is ready for use by a customer, the mechanical override cartridges can be conveniently removed by unscrewing them from the solenoid tubes and replacing them by threaded caps.

The invention yields several important advantages when used in association with a solenoid tube. The tube is provided with an aperture for the replaceable mounting of the mechanical override cartridge. This allows the tube to be fabricated without the cartridge being present, and it provides access for flushing the tube's interior with the cartridge removed. These are important attributes which are not present in existing solenoid tubes of the same geneal type. Such an existing tube has the override disposed in a bore in the tailpiece with an elastomeric O-ring providing a circumferential seal between the wall of the tailpiece bore and the outside of the override. The tailpiece is disposed at, and joins with, one end of a tubular sleeve. The armature is disposed within the sleeve, and the opposite end of the sleeve is closed by the pole piece. With such a construction, the overrides are non-removable, and non-destructive access to the tube's interior is not attainable.

Moreover, the fabrication procedure for such tubes requires use of certain joining techniques because of the non-magnetic nature of the sleeve. These techniques involve a critical quenching which, if not properly carried out, can result in heat propagating into the tailpiece to damage the seal between the override and the wall of the tailpiece bore. This problem is commonly referred to as O-ring burn and can cause damage to, or even total destruction of, the seal. Joining procedures, even sophisticated ones, may also result in the introduction of foreign matter, such as flash, into the tube's interior. Because existing tubes have non-removable overrides and are essentially enclosed, foreign matter cannot be flushed out nor can a damaged O-ring seal be replaced. Thus, a defective tube must be scrapped, and in actual practice, the production yield is noticeably less than 100%. With the present invention a significant improvement in yield, and attendant savings can result because the tube's interior can be flushed via the mounting aperture for the override cartridge and because the possibility of O-ring burn is eliminated.

An advantage of the invention which has generic application apart from solenoid tube mounting for the override cartridge involves the significant alleviation, or even entire elimination, of bore scoring which may occur within the bore containing the mechanical override. Conventional mechanical overrides are often operated by any convenient means which may be available, including objects not even intended for this purpose. In actual practice, the objects most frequently used are screw drivers, polygonally shaped wrenches, and similar tools, whose hardness is invariably greater than that of the wall of the bore containing the mechanical override. Thus, depending on the type of object which is used, scoring of the wall of the bore may occur, and this can result in leakage through the end of the bore, an obviously undesirable result. While at first blush it might seem that this problem could be avoided by hardening the wall of the bore, it should be remembered that such hardening, apart from the extra cost involved, increases the magnetic permeability which is detrimental to the magnetic circuit.

Still another problem which may be present in a mechanical override is pulsing of the override when the valve spool is operated to a position which permits free movement of the override within its bore. Such pulsing may occur because of pressure differentials across the interior and exterior axial ends of the mechanical override giving rise to a net force acting on it. For example, if a full vacuum is drawn on the interior end of the override, a force equivalent to one atmosphere of pressure is applied as an inward force on the override. The present invention has the capability to resist pulsing of the override in response to the presence of such forces yet when intentional operation is desired, this resistive force can be readily overcome to permit the mechanical override to push interiorly of the valve.

The override cartridge of the present invention further has the attribute of being fabricated with well known conventional fabrication procedures.

Thus, the invention provides important benefits for the valve manufacturer, the machine manufacturer, and the end user.

The foregoing features, advantages and benefits of the invention, along with additional ones, will be seen in the ensuing description and claims which should be taken in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
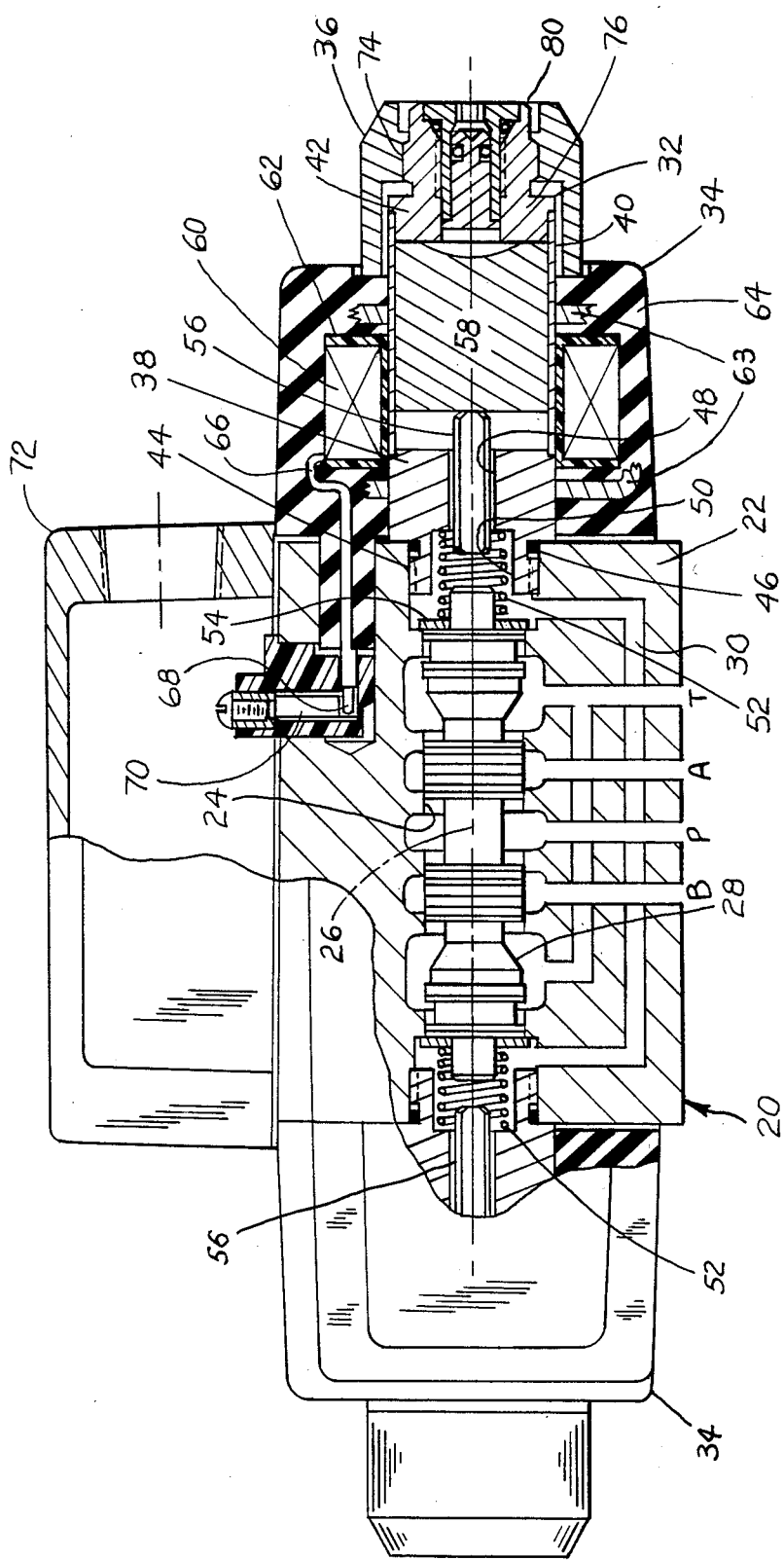
FIG. 1 is a longitudinal view, partly in section and having portions broken away, embodying the mechanical override cartridge of the present invention.

FIG. 1 illustrates an example of a solenoid valve 20 embodying principles of the present invention. The illustrated valve 20 is a three-position, four-way, spring-centered, double-solenoid-actuated directional valve. Principles of the invention are of course applicable to other types of solenoid valves.

Valve 20 comprises a valve body 22 containing a longitudinally extending spool bore 24 having a longitudinal axis 26. The spool bore is constructed with axially spaced annuli which are associated with respective ports of the valve identified by the convention letters P, A, B, and T. In use, the P-port is connected to a hydraulic fluid supply and the T-port is connected to tank. The A- and B-ports are connected with a power device such as a hydraulic cylinder.

A landed spool 28 is disposed for longitudinal displacement within spool bore 24 to control flow through the valve. FIG. 1 illustrates spool 28 in the centered position in which the spool lands block flow from the P-port to both A- and B-ports. When the spool is shifted to the left from its centered position, the P-port is communicated to the B-port and the A-port to the T-port. When the spool is shifted to the right from its centered position, the P-port is communicated to the A-port and the B-port is communicated to the T-port.

The illustrated valve body also contains a spool transfer loop 30 between chambers at opposite ends of bore 24 and this spool transfer loop is of the type illustrated in pending U.S. patent application Ser. No. 239,056, Filing Date Feb. 27, 1981, commonly assigned.

A solenoid tube 32 mounts on the valve body 22 at each end of spool bore 24. Both solenoid tubes are coaxial with axis 26. A corresponding solenoid coil assembly 34 is disposed on each tube 32 at the corresponding end of valve body 22 and is retained in place by a corresponding end cap 36 at the outer end.

Each solenoid tube comprises a pole piece 38, a tubular sleeve 40, and a tail piece 42. Sleeve 40 is of circular cylindrical shape with its opposite longitudinal ends fitted onto and suitably secured to the pole piece 38 and tail piece 42 respectively. The sleeve is of a low magnetic permeability material (stainless steel is preferred), and certain heating and quenching procedures are required in order to join the ends of the tube with the respective pole and tail pieces. Thus, each solenoid tube forms a unitary assembly which mounts on the valve body by means of a screw thread 44 provided on a neck portion of the pole piece which projects away from the tube and which threads into a complementary screw thread provided in the corresponding end of spool bore 24. An elastomeric O-ring seal 46 is fitted over screw thread 44 on the neck of the pole piece, and as can be seen in FIG. 1 it forms a circumferential seal around the end of spool bore 24 between the solenoid tube and the valve body.

Pole piece 38 is of tubular shape and it comprises a body having a central bore 48 with a counterbore 50 which faces toward the valve spool. A helical coil spring 52 is disposed concentric with axis 26 with one end of the spring fitting into counterbore 50. The opposite end of the spring bears against an annular element 54 fitted over the end segment of the valve spool and the spring urges the spool away from the corresponding solenoid tube.

The illustrated example of solenoid valve in FIG. 1 comprises the two springs 52 coacting on the valve spool to urge the valve spool to the centered position which is illustrated in FIG. 1. When the valve is operated to shift the spool to the right of the center position the right hand spring 52 yieldably compresses in length. When the spool is shifted to the right the left hand annular element 54 and the left hand spring 52 remain unaffected with the spool sliding through the left hand annular element 54 because the latter cannot be displaced to the right because its outer periphery axially abuts the land against which it is biased by the spring in the centered position. Similarly, when the valve is shifted to the left of the center position, the left hand spring 52 yieldably compresses and the right hand spring remains unaffected.

A solenoid pin 56 is disposed within bore 48 and serves to transmit the motion of an armature 58 within the solenoid tube to the valve spool when the valve spool is shifted by that armature. Armature 58 is similar to that shown in U.S. Pat. No. 4,194,173, commonly assigned, comprising a circular cylindrical element arranged to slide axially of axis 26 within sleeve 40. Its axial travel is limited by abutment with the pole piece and tail piece respectively. The right hand armature 58 illustrated in FIG. 1 is shown in its right-most position of travel and the right hand end of the solenoid pin is shown in abutment with the left hand end face of the armature. Armature 58 is of a high permeability magnetic material such as iron.

Each solenoid coil assembly 34 comprises a solenoid coil winding 60 disposed on a bobbin 62, and also preferably has an outer core 63, which is partially shown in the drawing. The solenoid coil winding comprises turns of wire wound on the bobbin and both the bobbin and winding along with the outer core are encased in a dielectric insulator encapsulation 64 leaving a central bore of circular cross section which allows the assembly to fit closely onto the solenoid tube 32. The lead wires from the coil winding 60 are designated by the reference numerals 66 and terminate in electrical terminal plugs 68 which are disposed to make connection with corresponding terminals of a terminal block assembly 70 on valve body 22 when the solenoid assembly is properly oriented and disposed against the end face of the solenoid valve body. A cover 72 removably mounts on the top of the valve body to enclose electrical lead wires (not shown) which enter the cover through an appropriate opening and which make connection to the terminals of the terminal blocks. Details of this electrical arrangement are illustrated in pending U.S. patent application Ser. No. 241,355, Filed Mar. 6, 1981 and commonly assigned.

FIG. 1 illustrates both solenoids in their deenergized conditions. When the right hand solenoid is fully energized, the corresponding armature 58 is displaced toward the valve body, (i.e. to the left) and will similarly urge its solenoid pin 56 to the left. The travel of armature 58 within the solenoid tube imparts enough displacement to the solenoid pin so that before the armature abuts the pole piece 38, the left hand end of the solenoid pin contacts the right hand end of the valve spool. The final increment of motion of the armature before it abuts pole piece 38 is sufficient to displace the valve spool to the left in an amount which is effective to communicate the P-port to the B-port and the A-port to the T-port. When the right hand solenoid is completely de-energized the left hand spring 52 is effective to return the spool to the center condition. Similarly, when the left hand solenoid is de-energized, the valve spool is shifted to the right to communicate the P-port to the A-port and the B-port to the T-port. When it is de-energized the right hand spring 52 returns the spool to the centered position.

Each tail piece contains a neck having a thread 74 extending around its outside, and each end cap 36 has a corresponding internal thread which threads onto the tail piece so that when the cap is threaded onto the tail piece it can be tightened to hold the solenoid in place against the valve body.

Figure 2:
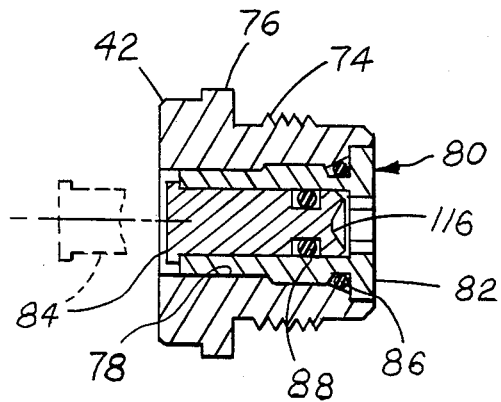
FIG. 2 is a longitudinal sectional view through a portion of the valve of FIG. 1 which contains the mechanical override cartridge of the present invention, the mechanical override cartridge also being shown in longitudinal cross section.
Figure 3:
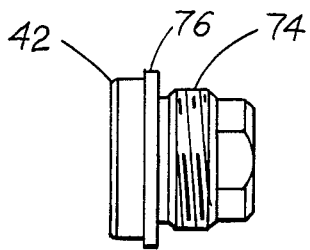
FIG. 3 is a longitudinal view corresponding to FIG. 2, not in section, but on a slightly reduced scale.
Figure 4:
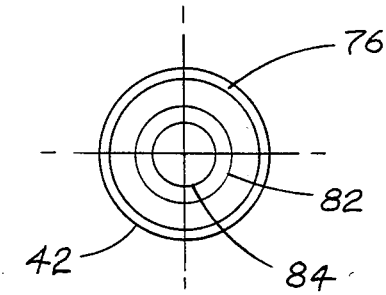
FIG. 4 is a left hand end view of FIG. 3.
Figure 5:
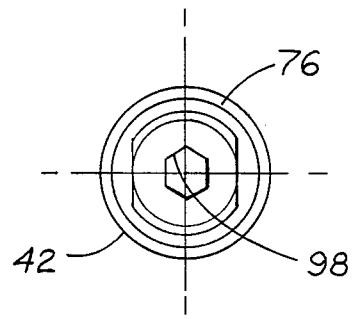
FIG. 5 is a right hand end view of FIG. 3.
Figure 6:
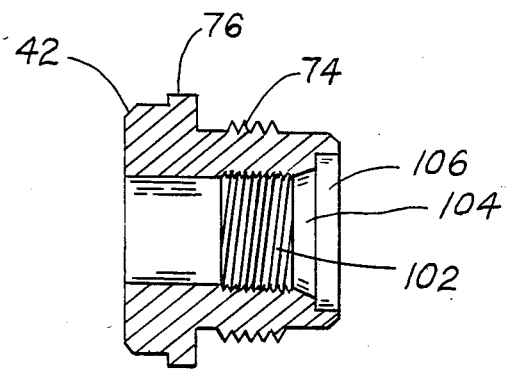
FIG. 6 is a longitudinal sectional view through one of the parts of FIG. 2 shown by itself.
Figure 7:
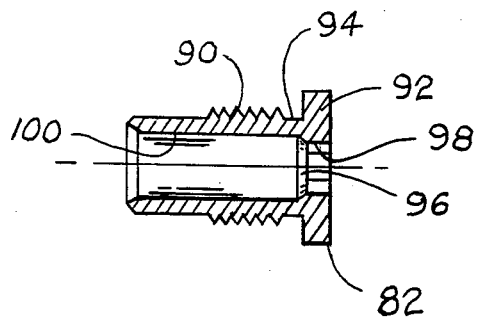
FIG. 7 is a longitudinal sectional view through another of the parts of FIG. 2 shown by itself.
Figure 8:
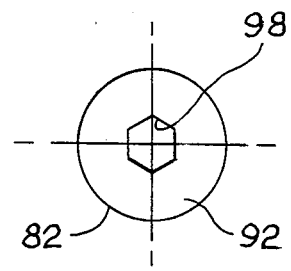
FIG. 8 is a full right hand end view of FIG. 7.
Figure 9:
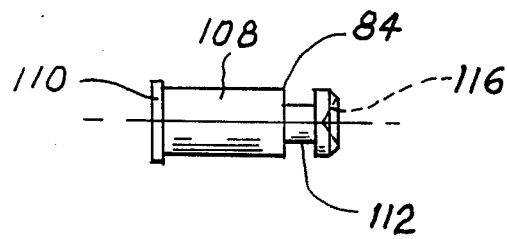
FIG. 9 is a longitudinal view of another one of the parts of FIG. 2 shown by itself.

The tail piece also comprises a flange 76 adjacent its left end as viewed in FIGS. 2 and 6 and this provides a locator and abutment for the right end of sleeve 40 when the two are assembled together.

The tail piece also comprises a central bore 78. The override cartridge 80 of the present invention mounts on the tail piece within bore 78.

The drawing FIGS. 2 and 6 through 9 illustrate details of the override cartridge. These drawing figures are oriented to show the right hand override cartridge of valve 20, and this particular embodiment of valve has a second cartridge at the left end of the valve. The two cartridges are identical, but on the valve appear symmetrically opposite in FIG. 1. The particular description which follows will be for the right hand cartridge of FIG. 1. The cartridge comprises four individual parts which are a tubular body 82, a mechanical override 84, and two O-ring seals 86 and 88.

Body 82 comprises a screw threaded portion around its outside as indicated at 90. A circular outwardly directed flange 92 forms a head at the right end of the body. The flange forms one axial end wall of a circular groove 94 extending around the outside of the tubular body between the screw threaded portion 90 and the flange 92. O-ring 86 is disposed in this groove 94.

The tubular body comprises a central bore concentric with axis 26, and this bore has a shoulder 96 which divides the bore into two segments. In the illustrated construction, one segment 98 is of non-circular transverse cross section at the right hand end which is toward the exterior of the valve. Shoulder 96 faces away from the exterior end of the cartridge and toward the interior end of the cartridge. As such it faces toward the valve body and toward the other segment 100 of the bore which is of circular transverse cross section.

The tail piece bore 78 is coaxial with axis 26 and it comprises a screw thread 102 which provides for connection with that of tubular body 82 (i.e. with 90). Extending axially from screw thread 102 toward the exterior of the override cartridge is a frusto-conically tapered surface 104 which tapers radially outward toward the exterior. Bore 78 terminates in a counterbore 106 at the right hand end face of body 82.

Mechanical override 84 comprises a main circular diameter 108 which fits closely within segment 100 of the bore of body 82, thereby forming a closure for the bore of the tubular body. The mechanical override also comprises an outwardly directed circular flange, or head, 110 at the interior end and it comprises a circular cylindrical groove 112 which is toward the exterior end.

O-ring 88 is disposed in groove 112 and the groove and O-ring are relatively dimensioned such that the O-ring is slightly compressed in the radial direction and the axial dimension of the groove is greater than the axial dimension of the O-ring. The O-ring provides a frictional engagement between the mechanical override and the tubular body bore segment 100 to provide a seal for hydraulic fluid but still permits the mechanical override to be shifted axially within bore segment 100 in response to operation of the mechanical override in a manner which will be explained later in greater detail.

FIG. 2 illustrates the mechanical override cartridge in the installed condition on the valve. The solid line position of the mechanical override represents the right hand limit of travel, and the broken line depicts the left hand limit of travel. In the solid line position, flange 110 is in axial abutment with the left hand end of tubular body 82. It will also be observed that the right hand end of the mechanical override terminates short of shoulder 96 so that it does not abut the shoulder, nor does any part of the mechanical override extend into the reduced diameter non-circular bore segment 98 beyond shoulder 96. As the mechanical override is displaced toward the broken line position it is guided by bore segment 100 and for all operative positions the seal 88 remains in sealing engagement between the wall of bore 100 and groove 112.

As can be appreciated from consideration of FIG. 1 and the foregoing detailed description of the axial displacement of the mechanical override 84 on the tubular body 82, operation of the mechanical override by axial displacement from the solid line position of FIG. 2 to the broken line position will be effective to displace the armature of the right hand solenoid tube from the position shown in FIG. 1 and into abutment with head piece 38. As such, it can be appreciated that the displacement of the mechanical override 84 from the solid line position of FIG. 2 to the broken line position of FIG. 2 is effective to move spool 28 to its left hand most position which communicates the P-port to the B-port and the A-port to the T-port.

Figure 10:
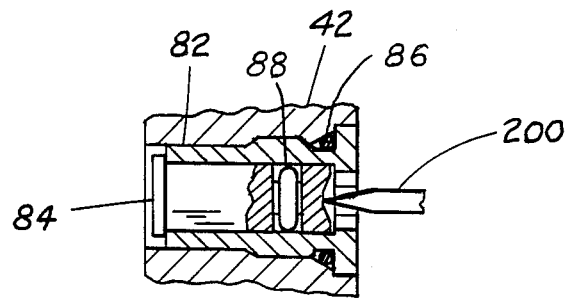
FIG. 10 is a longitudinal sectional view illustrating operation of the mechanical override of FIG. 2 by one type of tool.

The right hand exterior facing end of the mechanical override as viewed in FIG. 2 contains an indentation 116. This indentation serves a purpose in connection with particular tools which are used to operate the mechanical override. For example in the case of a pointed tool which is introduced through the bore of the tubular body 82 to operate the mechanical override, the indentation serves to axially center the tool, lessen the possibility of bore scoring. FIG. 10 illustrates such a pointed tool 200 having been inserted through the bore of the tubular body to engage the exterior facing end of the mechanical override. Displacement of the tool to push the override more interiorly is effective to displace the valve spool to the left of FIG. 1 in the manner described above. If the valve is in the center position (neither solenoid being energized), the initial displacement of solenoid pin 52 from the solid line position of FIG. 2 will simply take up lost motion. A point will be reached, however, where the motion is effective to displace the spool to the left from its center position. Travel is limited by abutment of armature 58 with pole piece 38. If the valve included detents and the spool were in its right hand position because of the left hand solenoid having previously been energized, displacement of the mechanical override from the solid line position of FIG. 2 will release the detent and be effective to displace the spool. The person actuating the override can return the spool to the center position, or by continuing to push the mechanical override to its innermost limit, he can move the spool to its left hand position.

Figure 12:
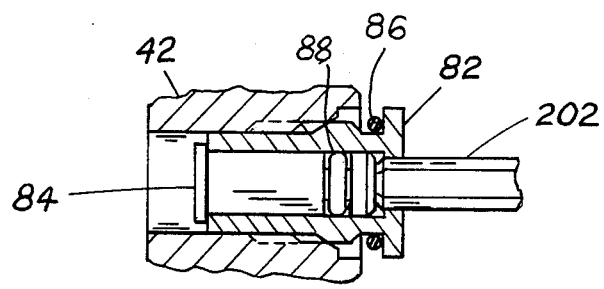
FIG. 12 is a view similar to FIG. 11 illustrating the process of removal of the mechanical override cartridge through use of a tool.

The major significance of the invention is the replaceable nature of the mechanical override cartridge. As explained above, for certain purposes the presence of mechanical overrides may be mandatory whereas for other purposes mechanical overrides may be deemed objectionable. With the present invention a solenoid valve containing one or more mechanical override cartridges allows them to be replaced whenever they have served their immediate purpose. Replacement is accomplished by unscrewing the tubular body 82 from the corresponding solenoid tube. FIG. 12 illustrates how this is accomplished.

The non-circular cross section of segment 98 provides a tool engagement surface for engagement by a tool of complementary non-circular cross section. In FIG. 12 the end of such a tool 202 is inserted into segment 98 and if rotated in the appropriate direction about axis 26 unthreads the cartridge. The frictional engagement of the mechanical override with the tubular body of the cartridge as provided by O-ring 88 will normally be effective to cause the mechanical override to be removed along with the tubular body. With the cartridge having been removed, it is still possible to operate the valve in the conventional manner if desired. Thus, the construction and arrangement is advantageous in that with one or both override cartridges removed the valve may be operated as usual with the only difference being that some fluid may leak out through the opening from which an override cartridge has been removed.

Figure 13:
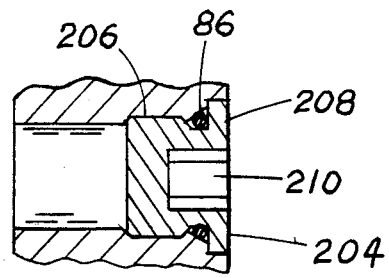
FIG. 13 is a longitudinal view corresponding to FIG. 2 but with the mechanical override cartridge removed and replaced by a closure.

The extent of leakage will depend upon the particular valve construction. It is therefore preferable to close each such opening by means of a closure. This is shown in FIG. 13 in which a threaded cap 204 has been threaded into the bore from which the manual override cartridge has been removed. The cap comprises a shape corresponding to that of tubular body 82 except that the cap is a full closure. It has a thread 206, a solid head 208, and a non-circular hole 210 in its exterior facing end for engagement by tool 202. The O-ring seal 86 is seated in a groove in the cap and is compressed in the same manner as when the override cartridge is installed. It should be pointed out of course that if a future need ever arises for use of a mechanical override, the cap is simply unthreaded by use of tool 202, and the mechanical override is reinstalled. Not only does the installed cap prevent leakage but it also guards against insertion or attempted insertion of tools or other objects into the bore of the tail piece.

The illustrated design of the mechanical override is advantageous in that it permits the use of conventional type replacement closure, or plug, which is of a standard configuration. In other words, the outer profile of the tubular body portion of the mechanical override is configured to match the profile of the existing standard plug. Hence, capping of the end is rendered especially convenient without the need for tooling a separate closure cap.

The invention possesses the attributes referred to earlier, and with the invention having been described in detail a better appreciation of these attributes can be gained. Specifically, it can be perceived that because of the replaceable nature of the mechanical override cartridge on the solenoid tube, the tube sleeve can be joined to the tail piece without the mechanical override being present. Thus the O-rings are not present during the joining process and are not susceptible to O-ring burn.

Figure 11:
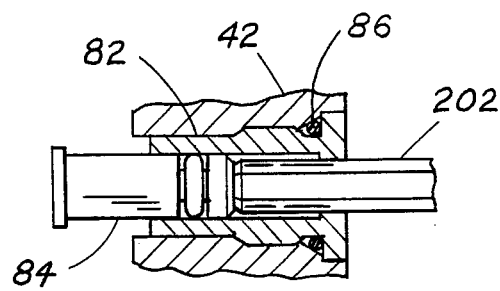
FIG. 11 is a longitudinal sectional view similar to FIG. 10 illustrating operation of the mechanical override by another type of tool.

The problem of bore scoring is eliminated, or at least substantially minimized because of two independent features, namely the indentation 116 in the end of the override, and the enlarged diameter of segment 100 relative to segment 98. As dramatically portrayed in FIG. 11, if the tool used to install and remove the override cartridge is used also to actuate the mechanical override, the fit provided between the tool and the non-circular segment 98 is such that the tool is axially centered and the end of the tool inserted into the bore is prevented from assuming a cocked position where it might score the wall of the segment 100 within which the override travels. Even if a different type of tool is used which does not have such a close fit with bore 100, there is less tendency for scoring because of the relative enlarged diameter segment 100 relative to segment 98. The provision of the indentation in the exterior end face of the mechanical override promotes axial centering of a tool, such as a pointed tool, so that the risk of straying of the tool which might score the wall is minimized.

The O-ring seal 88 also provides a sufficient frictional engagement between the mechanical override and the tubular body which (in order to displace the override within the bore of the tubular body) requires the application of a force greater than that corresponding to one atmosphere pressure differential acting on opposite ends of the mechanical override. This prevents any potential pulsing problems such as those referred to above.

Given the foregoing detailed description of the operation of the right hand override cartridge, it will be appreciated that the left hand override cartridge is operable in a symmetrical fashion for displacing the valve spool to the right from either the left position or the center position. The override cartridges may be of identical structure so as not to require unique right hand and left hand parts in the same manner that the solenoid tubes are themselves not unique right and left hand parts.

It will further be appreciated that for any given valve construction, one or more override cartridge may be used and that the number of cartridges used and the particular manner in which a cartridge is associated with any given valve will depend to a certain extend upon details of the particular valve construction. The illustrated valve construction comprises the right solenoid being effective to shift the valve spool to the left and the left solenoid to the right. Hence, with the valve in the center position, the right override is effective to displace the valve spool to the left position, and the left override to the right. When the right solenoid is energized such that the spool is in the left hand position, the left override is effective to displace the spool to the center position or even further to the right hand position, such displacement being against the force of the right solenoid which is urging the spool to the left. Similarly, when the left solenoid is energized so that the spool is in the right hand position, the right override is effective to overcome the solenoid force and operate the valve spool to the center position or even further to the left hand position. The generic aspect of the invention is an override cartridge which can be removed from the valve without impairment of the valve operation and replaced by a plug to prevent access to the valve spool. In the removal process the separation of the tubular body 82 from the valve will usually remove the mechanical override 84 as well along with the tubular body because of the frictional engagement provided by the O-ring seal 88. If for any reason that should not be the case, the separation of the tubular body from the valve provides access to the mechanical override such that it can be removed by itself. It should also be noted that when the override is separate from the tubular body, the flange 110 prevents incorrect assembly of the override to the tubular body.

The invention therefore provides an extremely useful improvement in solenoid valves. While a preferred embodiment of the invention has been disclosed, it will be appreciated that principles are applicable to other embodiments.

What is claimed is:

1. In a solenoid actuated fluid control valve comprising a spool bore within which a spool is shiftable to control fluid flow through the valve, electro-mechanical means including electrically operable solenoid means for shifting said spool within said spool bore in accordance with the condition of energization of said solenoid means, and a mechanical override for shifting said spool within said spool bore independent of said electro-mechanical means, the improvement which comprises a separate body containing said mechanical override, and means on the valve and said separate body separably mounting said separate body on the valve, the separable mounting of said separate body on the valve being constructed and arranged so as to affect neither the operation of said spool by said electro-mechanical means with said separate body and override removed from the valve nor the control of fluid flow through the valve by said spool with said separate body override removed from the valve.

2. The improvement set forth in claim 1 further including a closure having means for the separable mounting thereof on the valve in replacement of said separate body to prevent access to said spool from exterior of the valve when mounted on the valve in replacement of said separate body.

3. The improvement set forth in claim 1 in which said separate body is of tubular shape having a central bore, said mechanical override forming a closure for and being axially shiftable within said central bore, one axial end of said central bore providing access to said mechanical override so as to permit said mechanical override to be operated from the exterior of the valve, and means preventing said mechanical override from being removed from said central bore via said one axial end thereof.

4. The improvement set forth in claim 3 in which said separate body and said valve comprise a screw thread connection via which said separate body separably mounts on the valve, said screw thread connection being coaxial with said central bore, said one axial end of said central bore comprising a segment having a non-circular transverse cross section forming a tool engagement surface for a tool of complementary non-circular cross section to provide for removal and installation of said separate body from and on the valve by use of such a tool to engage said tool engagement surface and rotate said separate body about the axis of said central bore.

5. The improvement set forth in claim 4 wherein said valve comprises a body-receiving bore via which said separate body separably mounts on the valve, said central bore and said body-receiving bore being coaxial and said screw thread connection being provided between said body-receiving bore and said separate body, and further including an annular seal disposed circumferentially around the outside of said separate body to provide a circumferential seal between the outside of said separate body and said body-receiving bore.

6. The improvement set forth in claim 4 in which said central bore comprises a second segment extending away from said first-mentioned segment toward an axial end of said central bore opposite said one axial end, a shoulder disposed in said central bore between said two segments thereof and facing away from said one axial end, said mechanical override having an axially shiftable fit within said second segment of said central bore.

7. The improvement set forth in claim 6 in which said means preventing said mechanical override from being removed from said central bore via said one axial end thereof comprises a flange on said mechanical override disposed without said central bore to axially abut said separate body and thereby limit the axial shifting of said mechanical override in the direction from said opposite axial end of said central bore toward said one axial end of said central bore and thereby prevent said mechanical override from being removed from said central bore via said one axial end thereof.

8. The improvement set forth in claim 7 in which said central bore and said mechanical override are dimensioned relative to each other such that when said flange is in abutment with said separate body, no portion of said mechanical override is in axial abutment with said shoulder.

9. The improvement set forth in claim 8 in which said mechanical override is so dimensioned that when said flange is in axial abutment with said separate body, no portion of said mechanical override is disposed axially beyond said shoulder relative to said other axial end of said central bore.

10. The improvement set forth in claim 6 further including an annular seal disposed in a groove in one of said mechanical override and said separate body to provide a circumferential seal between said mechanical override and said second segment of said central bore, said groove having an axial dimension greater than the axial dimension of said annular seal, said valve comprising a body-receiving bore via which said separate body separably mounts on the valve, said central bore and said body-receiving bore being coaxial and said screw thread connecting being provided between said body-receiving bore and said separate body, and further including a second annular seal providing a circumferential seal between the outside of said separate body and said body-receiving bore, and said second annular seal being disposed axially more toward the exterior of the valve than said first annular seal.

11. The improvement set forth in claim 1 wherein said valve comprises a body-receiving bore via which said separate body separably mounts on the valve, said separate body being of tubular shape and having a central bore, said mechanical override forming a closure for and being axially shiftable within said central bore, one axial end of said central bore providing access to said mechanical override so as to permit said mechanical override to be operated from exterior of the valve and including an annular seal disposed circumferentially around the outside of said separate body to provide a circumferential seal between the outside of said separate body and said body-receiving bore of said valve, said central bore and said body-receiving bore being coaxial.

12. The improvement set forth in claim 11 in which said body-receiving bore comprises a frusto-conically tapered surface concentric therewith and axially facing toward exterior of the valve, said seal being disposed within a circumferential groove on the outside of said separate body, said groove, said frusto-conically tapered surface, and said seal being dimensioned relative to each other to dispose a radially inner portion of said seal against said groove and to dispose a radially outer portion of said seal against said frusto-conically tapered surface.

13. The improvement set forth in claim 12 in which said separate body terminates at said one axial end of said central bore in a flange which forms one axial wall of said groove, said flange extending radially outwardly beyond said frusto-conically tapered surface, and including a screw thread connection via which said separate body separably mounts on the valve, said screw thread connection being coaxial with said body-receiving bore, and said screw thread connection being disposed axially more interiorly of said body-receiving bore than said flange and said seal.

14. The improvement set forth in claim 13 in which said flange has a substantially flush mounting with an exterior end surface of the valve which is disposed circumferentialy around said flange.

15. The improvement set forth in claim 11 in which said body-receiving bore is provided in a wall at one end of a tubular sleeve of low magnetic permeability which contains an element of high magnetic permeability which is shiftable axially within said tubular sleeve in response to operation of said electromechanical means to shift said spool, said mechanical override being disposed to act upon said element in shifting said spool to override said electro-mechanical means.

16. The improvement set forth in claim 11 further including a second annular seal disposed in a groove in one of said mechanical override and said separate body to provide a circumferential seal between said mechanical override and said separate body, said groove having an axial dimension greater than the axial dimension of said second annular seal, said second annular seal comprising an elastomeric O-ring disposed in said groove and slightly compressed in the radial direction to provide a frictional engagement between said mechanical override and said separate body sufficient in response to pressure differential acting on opposite ends of said mechanical override substantially equal to one atmosphere to prevent said mechanical override from being axially shifted within said central bore when said spool is in a position which cannot be overridden by said mechanical override.

17. The improvement set forth in claim 1 in which said separate body and said mechanical override both have interior ends disposed toward the interior of the valve, said interior end of said mechanical override being disposed more interiorly than said interior end of said separate body for all operative positions of said mechanical override relative to said separate body.

18. The improvement set forth in claim 17 wherein said separate body comprises a central bore and said mechanical override forms a closure for and is axially shiftable within said central bore, and means to prevent said interior end of said mechanical override from being wrongly inserted into said central bore.

19. The improvement set forth in claim 1 in which said separate body is of tubular shape having a central bore, said mechanical override forming a closure for and being axially shiftable within said central bore, one axial end of said central bore providing access to said mechanical override so as to permit said mechanical override to be operated from exterior of the valve, said bore comprising a shoulder facing axially away from said one end and dividing said bore into two segments on opposite sides of said shoulder, said mechanical override fitting within the one of said two segments toward which said shoulder faces.

20. The improvement set forth in claim 19 in which no part of said mechanical override extends into the other of said two segments of said central bore for any operative position of said mechanical override, and including an indentation in said mechanical override facing toward said other segment to promote the axial centering of a tool inserted through said one axial end of said central bore to engage said indentation and operate said mechanical override.

21. The improvement set forth in claim 20 in which said other segment has a non-circular transverse cross section forming a tool engagement surface for a tool of complementary non-circular cross section to provide for removal and installation of said separate body from and on the valve by use of such a tool to engage said tool engagement surface and rotate said separate body about the axis of said central bore, said separate body and the valve having a screw thread connection coaxial with said central bore via which said separate body separably mounts on the valve.

22. The improvement set forth in claim 19 in which the other one of said two segments of said central bore has a non-circular transverse cross section forming a tool engagement surface for a tool of complementary non-circular cross section to provide for removal and installation of said separate body from and on the valve by use of such a tool to engage said tool engagement surface and rotate said separate body about the axis of said central bore, said separate body and the valve having a screw thread connection coaxial with said central bore via which said separate body separably mounts on the valve.

23. In a solenoid actuated fluid control valve comprising a valve body containing a spool bore within which a valve spool is shiftable to control fluid flow through the valve body, electro-mechanical means including electrically operable solenoid means for shifting said spool within said spool bore in accordance with the condition of energization of said solenoid means, and a mechanical override for shifting said spool within said spool bore independent of said electro-mechanical means, and in which said mechanical override mounts on said valve body by means of mounting structure comprising an override-receiving bore with said mechanical override forming a closure for, and being axially shiftable on said override-receiving bore, to override the operation of said spool by said electro-mechanical means, the improvement which comprises said mounting structure comprising two parts separably mounted together, one of said parts being mounted on said valve body and the other of said parts containing said override-receiving bore and said mechanical override, the separable mounting of said other part on said one part being constructed and arranged so as to affect neither the operation of said spool by said solenoid means with said other part and override removed from said one part nor the control of fluid flow through the valve by said spool with said other part and override removed from said one part.

24. The improvement set forth in claim 23 in which said one part comprises a tube having opposite axial ends and means mounting one of said axial ends on said valve body, the other axial end of said tube having an end wall comprising a mounting bore, said other part separably mounting in said mouting bore.

25. The improvement set forth in claim 23 further including a closure having means for the separable mounting thereof on said first part in replacement of said second part to prevent access to said spool from the exterior of the valve when mounted on said first part in replacement of said second part.

26. A mechanical override cartridge for use with a solenoid actuated valve comprising a tubular body having a bore and an exterior axial end and an interior axial end, means on said body providing for the separable mounting thereof on a solenoid actuated valve, and a mechanical override forming a closure for and axially shiftable within said bore, said mechanical override having an interior end which is disposed more interiorly of the interior end of said tubular body.

27. A mechanical override cartridge as set forth in claim 26 in which said tubular body comprises a screw thread on the outside surface thereof coaxial with said bore to provide for the separable mounting of said tubular body on a solenoid actuated valve, said screw thread being disposed axially more exteriorly than said interior end of said mechanical override.

28. A mechanical override cartridge as set forth in claim 27 in which said tubular body comprises a flange at the exterior axial end thereof extending outwardly around the outside of said tubular body, a groove disposed axially around the outside of said tubular body between said screw thread and said flange and including an annular seal disposed in said groove.

29. A mechanical override cartridge as set forth in claim 26 in which said bore comprises a shoulder facing axially away from the exterior end thereof and toward the interior end of said tubular body, said shoulder dividing said bore into two segments on opposite sides of said shoulder, said mechanical override fitting within the one of said two segments which is interior of the other of said two segments.

30. A mechanical override cartridge as set forth in claim 29 including means on the interior end of said mechanical override which prevents that end from being wrongly inserted into the bore of said tubular body and which is adapted to abut said tubular body so as to limit the shifting of said mechanical override in the direction from said interior end toward said exterior end, said mechanical override and said tubular body being dimensioned relative to each other such that when said means on said interior end of said mechanical override is in abutment with said body, no portion of said mechanical override is in axial abutment with said shoulder.

31. A mechanical override cartridge as set forth in claim 30 in which said mechanical override is so dimensioned that when said means on said interior end of said mechanical override is in axial abutment with said tubular body, no portion of said mechanical override is disposed axially exteriorly beyond said shoulder and including an indentation in said mechanical override facing toward said exterior end of said bore to promote axial centering of a tool inserted through the exterior end of said bore to engage said indentation and operate said mechanical override to displace it interiorly relative to said body.

32. A mechanical override cartridge as set forth in claim 29 in which the more exterior of said two segments comprises a non-circular transverse cross section forming a tool engagement surface for a tool of complementary non-circular cross section to provide for removal and installation of said body from and on a valve by use of such a tool to engage said tool engagement surface and rotate said body about said central bore, said body having a screw thread concentric with the axis of said bore to provide for its separable mounting on a valve.

33. In a solenoid actuated fluid control valve comprising a spool bore within which a spool is shiftable to control fluid flow through the valve, electro-mechanical means including electrically operable solenoid means for shifting said spool within said spool bore in accordance with the condition of energization of said solenoid means, and a mechanical override for shifting said spool within said spool bore independent of said electro-mechanical means, the improvement which comprises a separate body containing said mechanical override, and means on the valve and said separate body separably mounting said separate body on the valve, the said separate body, said override, and separable mounting of said separate body on the valve being constructed and arranged such that the act of separating said separate body from the valve creates access to said mechanical override allowing said mechanical override to be removed from said separate body and the valve, the separable mounting of said separate body on the valve also being constructed and arranged so as to affect neither the operation of said spool by said solenoid means with said separate body and override removed from the valve nor the control of fluid flow through the valve by said spool with said separate body and override removed from the valve.

34. A mechanical override cartridge for use with a solenoid actuated valve comprising a tubular body having a bore and an exterior axial end and interior axial end, means on said body providing for the separable mounting thereof on a solenoid actuated valve, and a mechanical override forming a closure for and axially shiftable within said bore, said bore comprising a shoulder facing axially away from the exterior end thereof and toward the interior end thereof, said shoulder dividing said bore into two segments on opposite sides of said shoulder, said mechanical override fitting within the one of said two segments which is interior of the other of said two segments and not within said other segment.

35. A mechanical override cartridge as set forth in claim 35 in which said other of said two segments of said bore comprises a non-circular transverse cross section.

36. A mechanical override cartridge as set forth in claim 35 in which said mechanical override includes an indentation facing toward said exterior end of said bore to promote axial centering of a tool inserted through the exterior end of said bore to engage said indentation for operating said mechanical override to displace it interiorly relative to said body.

37. A mechanical override cartridge for use with a solenoid actuated valve comprising a tubular body having a bore and an exterior axial end and an interior axial end, means on said body providing for the separable mounting thereof on a solenoid actuated valve, and a mechanical override forming a closure for and axially shiftable within said bore, said bore comprising a non-circular transverse cross section forming a tool engagement surface for a tool of complementary non-circular cross section to provide for removal and installation of said body from and on a valve by use of such a tool to engage said tool engagement surface and rotate said body about said central bore, said means on said body providing for the separable mounting thereof on a solenoid actuated valve comprising a screw thread concentric with the axis of said bore.

38. A mechanical override cartridge as set forth in claim 37 in which said mechanical override includes an indentation facing toward said exterior end of said bore to promote axial centering of a tool inserted through the exterior end of said bore to engage said indentation for operating said mechanical override to displace it interiorly relative to said body.

39. A mechanical override cartridge for use with a solenoid actuated valve comprising a tubular body having a bore and an exterior axial end and an interior axial end, means on said body providing for the separable mounting thereof on a solenoid actuated valve comprising a screw thread extending around said body coaxial with said bore, and a mechanical override forming a closure for and axially shiftable within said bore, said exterior end of said body comprising a radially outwardly directed flange and an O-ring seal disposed around the outside of said body interiorly of said flange to provide for a seal around the outside of said body when the cartridge is mounted on a valve, said body including tool engagement means at the exterior end adapted for engagement by a tool to rotate said body about said bore for removal and installation of the cartridge from and on a valve.

* * * * *

UNITED STATES PATENT AND TRADEMARK OFFICE
CERTIFICATE OF CORRECTION

PATENT NO. : 4,574,843
DATED : March 11, 1986
INVENTOR(S) : Ronald L. Loup, Curtis H. Day It is certified that error appears in the above-identified patent and that said Letters Patent is hereby corrected as shown below:

Column 2, line 11, "must" should read --much--.

Column 10, line 13, "extend" should read --extent--.

Column 11, line 1, insert --and-- between "body" and "override".

Column 12, line 15, "connecting" should read --connection--.

Signed and Sealed this

Twelfth Day of August 1986

[SEAL]

Attest:

DONALD J. QUIGG

Attesting Officer

Commissioner of Patents and Trademarks